United States Patent

Beyda et al.

[11] Patent Number: 6,049,326
[45] Date of Patent: *Apr. 11, 2000

[54] SYSTEM AND METHOD FOR DUAL BROWSER MODES

[75] Inventors: William J. Beyda, Cupertino; Shmuel Shaffer, Palo Alto, both of Calif.

[73] Assignee: Siemens Information and Communication Networks, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/864,873

[22] Filed: May 12, 1997

[51] Int. Cl.⁷ ........................................................ G09G 5/08
[52] U.S. Cl. ............................................ 345/157; 345/145
[58] Field of Search .................................. 345/145, 146, 345/156, 157, 348

[56] References Cited

U.S. PATENT DOCUMENTS

| | | |
|---|---|---|
| 5,491,494 | 2/1996 | Cornett et al. ............................ 345/118 |
| 5,559,943 | 9/1996 | Cyr et al. . |
| 5,737,555 | 4/1998 | Gregg et al. ............................. 345/145 |
| 5,745,099 | 4/1998 | Blomqvist ................................ 345/145 |
| 5,745,715 | 4/1998 | Pickover .................................. 345/348 |
| 5,757,358 | 5/1998 | Osga ....................................... 345/156 |
| 5,793,354 | 8/1998 | Kaplan .................................... 345/157 |
| 5,808,601 | 9/1998 | Leah et al. .............................. 345/145 |

OTHER PUBLICATIONS

James D. Foley, Computer graphics: principles and practice, pp. 48–50 and 338–339, 1990.

Primary Examiner—Steven J. Saras
Assistant Examiner—Alecia D. Nelson

[57] ABSTRACT

A system and method for determining the relative distances from a plurality of hyperlinks 206 to a cursor 202 when a select button is depressed. The relative distances are compared and the hyperlink corresponding to the shortest distance has its function activated. If the distances are determined to be identical or if the distances are determined to be within a predetermined range of one another, the hyperlinks 206 are not activated. Instead, the user positions the cursor 202 such that it is relatively closer to one of the two or more relatively equidistant hyperlinks 206 and clicks again.

8 Claims, 4 Drawing Sheets

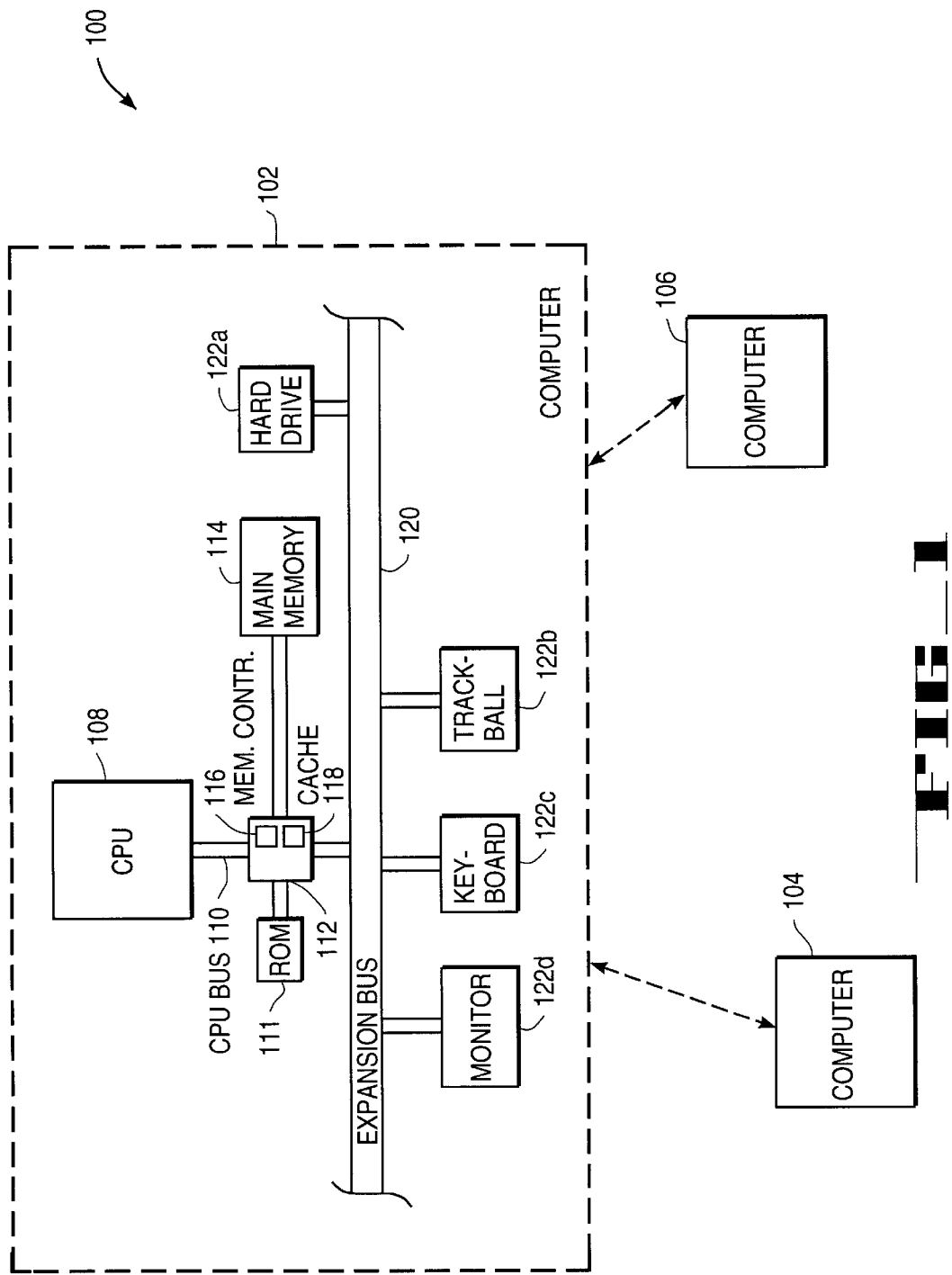

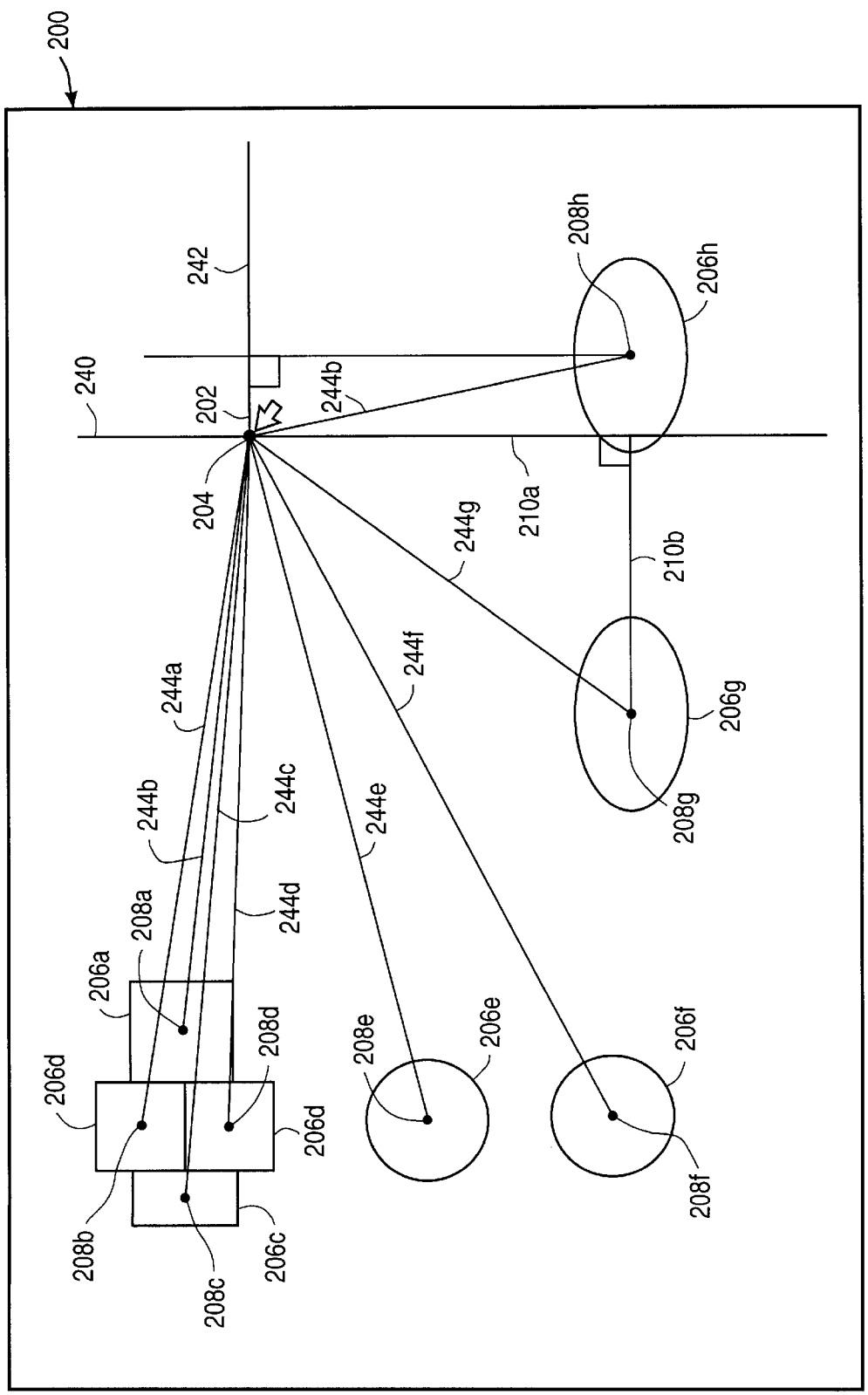
FIG_2

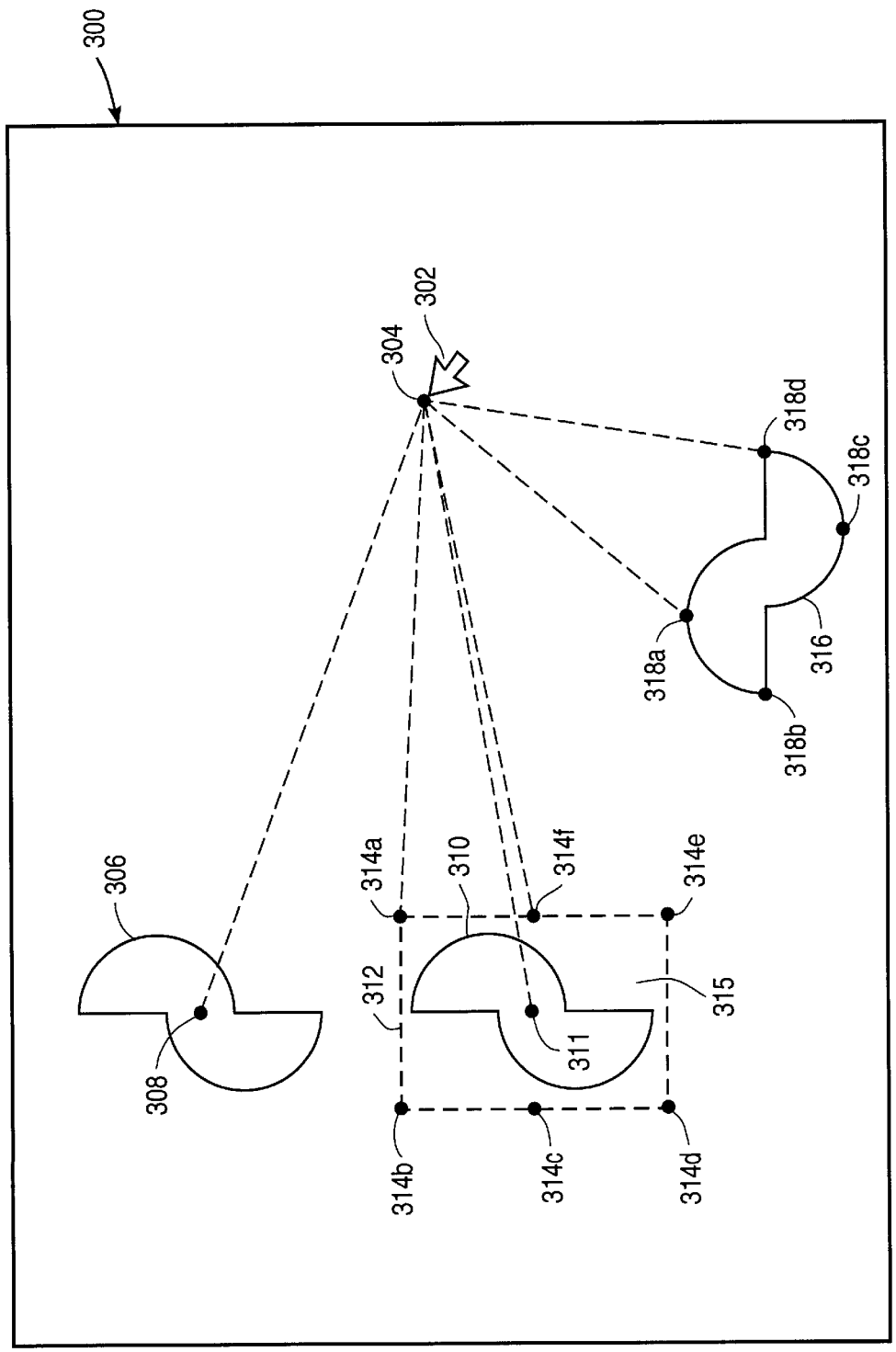
FIG_3

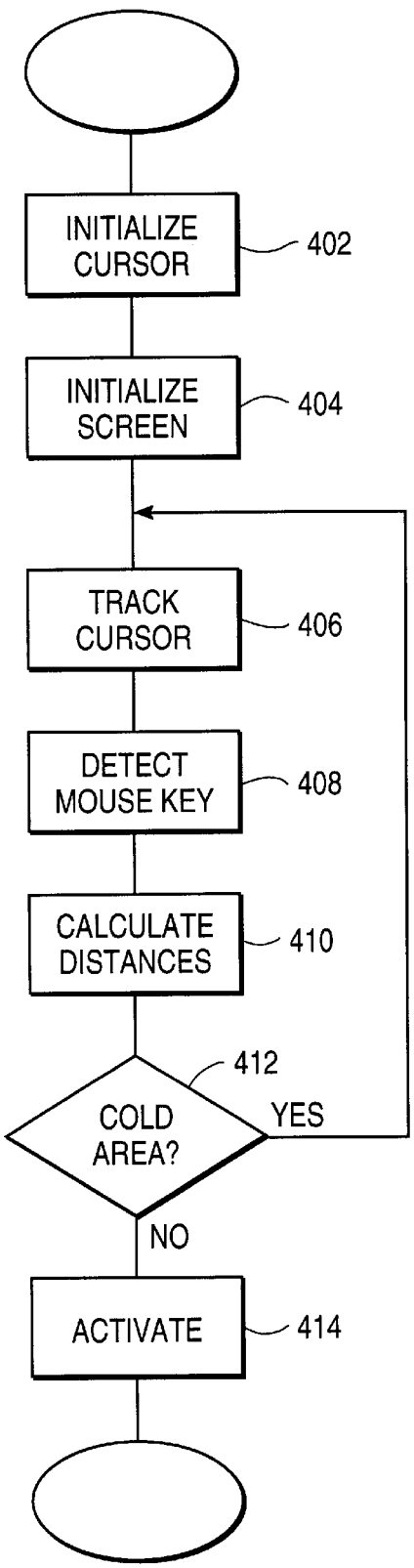
FIG_4

SYSTEM AND METHOD FOR DUAL BROWSER MODES

BACKGROUND OF THE INVENTION

The present invention relates to graphical user interfaces for computers and more particularly, to a graphical user interface in which a cursor is directed to an activatable icon or hyperlink when a control or mouse button is clicked.

Graphical user interfaces for computers such as Microsoft Windows software and Internet browser software such as Netscape Navigator are based on the use of program or function icons or hyperlinks and point and click action of a cursor pointing device such as a mouse or trackball. Typically, hot or active regions of such hyperlinks (i.e., those regions that trigger an action when "clicked" by a mouse key, or that cause control to be transferred to a different hypertext document) are limited in geographic scope such that a user must position a cursor with relative precision upon the hyperlink in order to insure that clicking the appropriate button of the cursor pointing device will activate the hyperlink. If the user clicks on the screen outside of the geographic range of the hyperlink, nothing occurs.

In that case, the user must reposition the cursor using the cursor pointing device. In many instances, this can be a source of frustration for the user because the user generally does not click a cursor pointing device's select button unless he wishes to activate some function associated with it. Moreover, cursor pointing devices such as the "eraser head" stick-type pointer device for laptop computers and touch-pad pointing devices are not necessarily easy to control with the requisite precision. Accordingly, the act of positioning the cursor pointing device within the geographic range of a hyperlink can be a source of frustration and wasted time.

Certain applications programs permit users to click on an area surrounding an icon or hyperlink in order to select the desired action. However, such programs are relatively rigid in that the area is defined by the application programmer. Moreover, by defining larger and larger geographical regions surrounding hyperlinks, the number of such hyperlinks permitted per page is limited.

Accordingly, there is a need for a graphical user interface in which a user can click on a region relatively remote from a hyperlink and still cause activation of the function defined by the hyperlink and which does not require undue amounts of programmer or user attention.

SUMMARY OF THE INVENTION

These and other drawbacks of the prior art are overcome in large part by a system and method for determining the relative distances from a plurality of hyperlinks or function icons to a cursor when a select button is depressed. The relative distances are compared and the hyperlink corresponding to the shortest distance has its function activated. If the distances are determined to be identical or if the distances are determined to be within a predetermined range of one another, the hyperlinks are not activated. Instead, the user positions the cursor such that it is relatively closer to one of the two or more relatively equidistant clickable hyperlinks.

According to this method, the programmer need only define a placement for the hyperlink within a predetermined range on a screen of the graphical user interface. A predetermined point is selected as the location of the hyperlink. In one embodiment, the predetermined point is the centroid of the graphic of the hyperlink. In another embodiment, the predetermined point is a centroid of a predetermined framing region around the hyperlink. In still another embodiment, the predetermined point is a point on the edge of the framing region of the hyperlink. Finally, in yet another embodiment, the predetermined point is a point on the edge of the hyperlink graphic itself.

BRIEF DESCRIPTION OF THE DRAWINGS

A better understanding of the present invention is obtained when the following detailed description is considered in conjunction with the following drawings in which:

FIG. 1 is a block diagram of a computer and computer network system according to one embodiment of the invention;

FIG. 2 is a diagram illustrating a distance determining technique according to an embodiment of the present invention;

FIG. 3 is a diagram illustrating the determination of various reference points for use in a distance determining technique according to an embodiment of the present invention; and FIG. 4 is a flowchart illustrating a method according to an embodiment of the present invention.

DETAILED DESCRIPTION OF THE INVENTION

Turning now to the drawings, and with particular attention to FIG. 1, a computer network system 100 according to the present invention is illustrated. Network computer system 100 includes at least one computer 102 which is coupled, for example, via an Internet connection to computers 104 and 106. It is noted that a variety of computers and computer network systems may be employed; thus, FIG. 1 is exemplary only. Computer 102 includes a central processing unit (CPU) 108 which is representative of, for example, a Pentium or Pentium Pro-type processor available from Intel Corp. CPU 108 is configured to run software which preferably implements the method according to the present invention. CPU 108 is coupled via a CPU bus 110 to a bus bridge 112. Bus bridge 112 in turn is coupled to a main memory 114 and includes a memory controller 116 and a cache and cache memory controller 118. Main memory 114 is preferably random access memory (RAM) used to temporarily store information used by CPU 108 in running programs. Read only memory (ROM) 111 is also coupled to bus bridge 112. Programs, such as BIOS (basic input output system), stored in ROM 111 may be run by CPU 108.

Bus bridge 112 couples CPU 108 to an expansion bus 120. Expansion bus 120 is preferably a Peripheral Component Interconnect (PCI) bus, but may also be a bus compatible with the Industry Standard Architecture (ISA), the Extended Industry Standard Architecture (EISA) or the Microchannel Architecture (MCA).

A plurality of expansion or peripheral bus devices 122a–122d are coupled to expansion bus 120. The expansion bus devices include, for example, a hard disk drive 122a, floppy disk drives, CD ROM drives, cursor pointing devices such as mice or trackballs 122b, keyboards 112c, monitors 122d, and video and sound cards, as well as network interface cards. Peripheral bus devices 122a–122d may also include PC Card (formerly known as PCMCIA cards) adapters. Hard disk drive 122a preferably stores a program executable by CPU 108 which runs the graphical user interface according to the present invention.

Turning to FIG. 2, an exemplary graphical user interface 200 is shown. Graphical user interface 200 includes a cursor 202 and a plurality of hyperlinks or function icons 206a–206h. Each hyperlink 206a–206h has a reference point 208a–208h. Cursor 202 has a reference point 204. According to the present invention, CPU 108 determines a coordinate system for graphical user interface 200. For example, the coordinate system may be an x-y Cartesian coordinate system which may be based on point 204 as origin with y-axis as 240 and x-axis 242. It is noted that other parts of graphical user interface 200 may form the origin, for example, the center point of graphical user interface 200. In addition, it is noted that while illustrated as comprising the entirety of graphical user interface 200, the coordinate system may include only a predetermined portion of graphical user interface 200. For example, in the case of a frames-capable browser, each frame preferably has its own coordinate system.

CPU 108 already "knows" the location of the reference points 208a–208h of hyperlinks 206a–206h from an initialization procedure such as when the graphical user interface is initially brought up on the screen. The locations of the center points may then be maintained, for example, in a look up table in RAM for easy reference. When a user clicks a select button on a cursor pointing device, CPU 108 determines a coordinate of the reference point 204 of cursor 202. The reference point 204 of cursor 202 is then used to determine the distances to reference points 208a–208h of hyperlinks 206a–206h, as represented by the lines 244a–244h. Since the graphical user interface is typically a Cartesian coordinate graph, the distance vectors 244a–244h may be thought of as the hypotenuses of right triangles. As such, by solving the Pythagorean relationship (d=sqrt{$(x_2-x_1)^2+(y_2-y_1)^2$}, where $(x_1, y_1)$ and $(x_2,y_2)$ are the coordinates of the hyperlink reference point and the cursor reference point) based on the Cartesian coordinates of the reference points 208a–208h and the cursor reference point 204, the distances between the reference point 204 and the reference points 208a–208h may be determined. For reference points 208a–208h lying on a reference line, the distance may be determined by simply subtracting distance units from one another.

Once CPU 108 determines the closest hyperlink, CPU 108 activates the function that has been selected through clicking on the appropriate hyperlink. For example, in the case of an Internet browser, the function may be a hyperlink to a next web page.

If reference point 204 is determined to be equidistant to reference points 208a–208h, CPU 108 preferably will do nothing, other than continuing to monitor the cursor, until the cursor reference point 204 (and hence cursor 202) are moved to a different position relative to the respective hyperlink reference points 208a–208h. It is noted that in one embodiment, it is not necessary that reference point 204 be absolutely equidistant from two or more of hyperlink reference points 208a–208h in order for CPU 108 to enter a wait state allowing the user to move the cursor before again determining distances responsive to a select action. Thus, for example, if two of the reference points are determined to be within 10% of the same distance from reference point 204, then CPU 108 will wait for subsequent actions of the user. This prevents unintended "jumps" in the case of an Internet graphical browser, for example.

It is noted that the discussion of FIG. 2 has been assuming that reference points 208a–208h are located at the center of substantially symmetrical hyperlinks 206a–206h. There reference points for use with the method of the present invention, however, may be determined according to a variety of ways regardless of whether the hyperlink itself is completely symmetrical.

Turning now to FIG. 3, a graphical user interface 300 is illustrated showing three substantially identical hyperlinks 306, 310 and 316. According to the present invention, reference point 308 of hyperlink 306 is used as the reference point to determine the distance from the hyperlink to cursor 302's reference point 304. Reference point 308 may be defined as the centroid of hyperlink 306. As is well known, the centroid is the location (in terms of x and y coordinates) having the x coordinate, which is the average of all the x coordinate points within the object (in this case the hyperlink) and the y coordinate is the location of the average y coordinate of points in the object. This relationship is, of course, a generalized relationship for asymmetrical and symmetrical objects.

Hyperlink 310 is illustrated as being embedded in a framing area 312. Framing area 312 may be "invisible" and blended with the background wallpaper of graphical user interface 300. Background 312 typically forms a square or rectangular region around hyperlink 310. As illustrated generally by the dashed lines, any point on the edge of framing region 312 may be used as the reference point for determining the distance of hyperlink 310 to reference point 304 of cursor 302. For example, reference point 314a forms a corner of framing region 312. Point 314f is a midway point of the edge of framing region 312 represented by the line segment 314a–314e. Any of the points along 312 may be used as a reference point but, for convenience sake, a halfway point or a corner point is typically used. In addition, it is noted that a centroid of the framing region 312 may be used as the reference point. Such a centroid 311 may also be the centroid of the graphical hyperlink 310 itself, but need not be. It is noted that whichever reference point is used on area region 312 or centroid 311, it is preferable that such a point be used consistently across all of the hyperlinks on the particular page.

In addition to basing the reference point of the hyperlink on the centroid of the hyperlink, the centroid of the framing region, or a point on the edge of the framing region itself, various points of the actual hyperlink may also be used to determine the reference point. For example, points 318a or 318d on hyperlink 316 may be used as the reference point. Again, it is preferred that a point be consistently chosen. In the case of a plurality of differently shaped hyperlinks, such a point may be an extremum in the x or y directions.

A method according to the present invention includes first initializing a mouse or cursor reference point in a step 402. Next, a particular screen of a graphical user interface is initialized in a step 404. For example, a particular web page may be accessed. Initializing the screen includes locating "hot" objects such as hyperlinks within particular "windows" or frames. In addition, this may include identifying a reference point such as a centroid of a framing region or an extreme point of the hyperlink itself. Furthermore, initializing the screen includes identifying an x-y coordinate system.

Once the particular cursor and screen have been initialized, the CPU 108 tracks movements of the cursor in a step 406. The processor 108 identifies a clicked mouse key or other cursor select key in a step 408. Once the CPU 108 identifies that a cursor selection device has made a selection, the CPU 108 uses the reference point of the cursor and the reference points of the hyperlinks to determine the distances between the cursor and the reference points of the hyperlinks in a step 410. In a step 412, the CPU 108 compares the distances. If the distances are within a predetermined value of one another, the processor will not undertake any action beyond continuing to track the cursor. If, however, none of the distances were determined to be within a predetermined value of one another, the CPU 108 will cause the closest cursor to be activated and its function called in a step 414.

The invention described in the above detailed description is not intended to be limited to the specific form set forth herein but, on the contrary, it is intended to cover such alternatives, modifications and equivalents as can-be reasonably included within the spirit and scope of the appended claims. In particular, it is noted that while the invention has been described with respect to a Web browser, is intended to cover any type of graphical user interface employing program or function icons.

What is claimed is:

1. A method for controlling a user interface including one or more hyperlinks activatable by clicking a cursor pointing device, comprising:

calculating distances in a predetermined area of a screen between a location of a cursor and positions of said one or more hyperlinks, said one or more hyperlinks defined by visible hyperlink regions and invisible framing regions, a predetermined number of said positions being defined by points on said framing regions of said one or more hyperlinks; and selecting one of said one or more hyperlinks responsive to a determination that a distance between said location of said cursor and a position of said one is a minimum.

2. The method for controlling a user interface according to claim 1, wherein one or more of said positions are defined by predetermined edge points on edges of said framing regions of said one or more hyperlinks.

3. A computer system, comprising:

a central processing unit (CPU);

a cursor pointing device operably coupled to said CPU; and a video monitor, said video monitor being configured to display a graphical user interface, said graphical user interface displaying a cursor controlled by said cursor pointing device and a plurality of hyperlinks, said hyperlinks defining a function to be performed by said CPU, said plurality of hyperlinks defined by visible hyperlink regions and invisible framing regions;

wherein said CPU is configured to calculate a distance between a cursor reference point on said cursor and a hyperlink reference point of said plurality of hyperlinks responsive to an input from said cursor pointing device, and is configured to activate a function defined by a closest of said hyperlinks to said cursor pointing device, one or more of said hyperlink reference points being points on framing regions of said one or more hyperlinks.

4. A computer system according to claim 3, wherein said CPU is further configured to monitor movement of said cursor prior to activating a function defined by a hyperlink if said CPU determines that two or more distances are within a predetermined value of one another.

5. A computer system comprising:

means for determining distances between a cursor on a video screen and points on framing regions of a plurality of hyperlinks on said video screen, said plurality of hyperlinks defined by visible hyperlink regions and invisible framing regions; and means for actuating one of said hyperlinks as a function of said distances.

6. The computer system of claim 5, wherein said actuating means includes means for activating functions associated with said hyperlinks.

7. A computer system according to claim 6, wherein said determining means includes means for waiting for a movement of said cursor responsive to a determination that one or more of said hyperlinks are substantially equidistant to said cursor.

8. A computer system according to claim 7, wherein said determining means calculates said distances responsive to an input after said cursor is moved.

* * * * *